United States Patent
Lee et al.

(10) Patent No.: US 9,668,273 B2
(45) Date of Patent: May 30, 2017

(54) METHOD AND APPARATUS FOR APPLYING AUTONOMOUS DENIAL IN WIRELESS COMMUNICATION

(71) Applicant: LG ELECTRONICS INC., Seoul (KR)

(72) Inventors: Jaewook Lee, Seoul (KR); Youngdae Lee, Seoul (KR); Seung June Yi, Seoul (KR); Sunghoon Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 78 days.

(21) Appl. No.: 14/437,798

(22) PCT Filed: Oct. 24, 2013

(86) PCT No.: PCT/KR2013/009519
§ 371 (c)(1),
(2) Date: Apr. 22, 2015

(87) PCT Pub. No.: WO2014/069838
PCT Pub. Date: May 8, 2014

(65) Prior Publication Data
US 2015/0282200 A1    Oct. 1, 2015

Related U.S. Application Data

(60) Provisional application No. 61/721,006, filed on Oct. 31, 2012.

(51) Int. Cl.
*H04W 4/00* (2009.01)
*H04W 72/12* (2009.01)
(Continued)

(52) U.S. Cl.
CPC ........... *H04W 72/12* (2013.01); *H04W 48/02* (2013.01); *H04W 72/0446* (2013.01);
(Continued)

(58) Field of Classification Search
CPC . H04W 28/06; H04W 48/02; H04W 72/0446; H04W 72/082; H04W 72/12;
(Continued)

(56) References Cited

U.S. PATENT DOCUMENTS

2012/0020229 A1    1/2012  Dayal et al.
2012/0040715 A1    2/2012  Fu et al.
(Continued)

FOREIGN PATENT DOCUMENTS

WO    2012-103177 A1    8/2012

OTHER PUBLICATIONS

3GPP TR 36.816 v11.2.0: 3rd Generation Partnership Project; Technical Specification Group Radio Access Network; Evolved Universal Terrestrial Radio Access (E-UTRA); Study on signalling and procedure for interference avoidance for in-device coexistence (Release 11), Dec. 2011, XP050555147.

(Continued)

*Primary Examiner* — Kan Yuen
(74) *Attorney, Agent, or Firm* — Dentons US LLP

(57) ABSTRACT

A method and apparatus for applying autonomous denial in a wireless communication system is provided. A user equipment (UE) counts the number of aggregated denials of uplink (UL) subframes in all serving cells or each serving cell over a validity period including previous subframes and a current subframe. If the number of aggregated denials of UL subframes in all serving cells or each serving cell is less than a threshold, the UE is allowed to deny scheduled UL transmission at the current subframe.

4 Claims, 13 Drawing Sheets

(51) Int. Cl.
   *H04W 48/02*   (2009.01)
   *H04W 72/04*   (2009.01)
   *H04W 72/08*   (2009.01)
   *H04W 76/02*   (2009.01)
   *H04W 76/04*   (2009.01)
   *H04W 28/06*   (2009.01)
   *H04W 88/06*   (2009.01)

(52) U.S. Cl.
   CPC ..... *H04W 72/082* (2013.01); *H04W 72/1215* (2013.01); *H04W 76/027* (2013.01); *H04W 76/046* (2013.01); *H04W 28/06* (2013.01); *H04W 88/06* (2013.01)

(58) Field of Classification Search
   CPC ........... H04W 72/1215; H04W 76/027; H04W 76/046; H04W 88/06
   See application file for complete search history.

(56) References Cited

U.S. PATENT DOCUMENTS

| 2014/0094125 | A1* | 4/2014 | Behravan | H04W 24/02 455/63.1 |
| 2015/0195848 | A1* | 7/2015 | Hong | H04W 72/1215 455/450 |

OTHER PUBLICATIONS

3GPP TS 36.300 V11.3.0: 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11), Dec. 2012, XP050649950.

3GPP TS 36.331 V11.1.0: 3rd Generation Partnership Project; Technical Specification Group Radio Access Network; Evolved Universal Terrestrial Radio Access (E-UTRA); Radio Resource Control (RRC); Protocol specification (Release 11), Sep. 2012, XP050649953.

Qualcomm Incorporated (Rapporteur): "Report of Email discussion [78#51] LTE/IDC: Autonomous Denials", 3GPP TSG RAN WG2 Meeting #79, R2-123813, Aug. 13-17, 2012.

Huawei (Rapporteur): "(Draft) Report of email discussion [79#33] [LTE/IDC] IDC Open Issues", 3GPP TSG RAN WG2 Meeting #79Bis, R2-124404, Oct. 8-12, 2012.

Huawei et al., "Addition of the stage 2 agreements on IDC", R2 125108, 3GPP TSG-RAN WG2 Meeting #79bis, Bratislava, Slovakia, Oct. 8-12, 2012 See pp. 1-4.

Motorola Mobility, "Denial rate for Autonomous Denials", R2 124092, 3GPP TSG RAN WG2#79, QingDao, China, Aug. 13-17, 2012 See pp. 1-4.

* cited by examiner

METHOD AND APPARATUS FOR APPLYING AUTONOMOUS DENIAL IN WIRELESS COMMUNICATION

This application is a National Stage Entry of International Application No. PCT/KR2013/0,009519, filed Oct. 24, 2013, and claims the priority to and benefit of U.S. Provisional No. 61/721,006 filed on Oct. 31, 2012, each of which are hereby incorporated by reference in their entirety for all purposes as if fully set forth herein.

BACKGROUND OF THE INVENTION

Field of the Invention

The present invention relates to wireless communication, and more particularly, to a method and apparatus for applying autonomous denial in a wireless communication system.

Related Art

Universal mobile telecommunications system (UMTS) is a 3rd generation (3G) asynchronous mobile communication system operating in wideband code division multiple access (WCDMA) based on European systems, global system for mobile communications (GSM) and general packet radio services (GPRS). A long-term evolution (LTE) of UMTS is under discussion by the 3rd generation partnership project (3GPP) that standardized UMTS.

In order to allow users to access various networks and services ubiquitously, an increasing number of user equipments (UEs) are equipped with multiple radio transceivers. For example, a UE may be equipped with LTE, Wi-Fi, Bluetooth (BT) transceivers, etc., for wireless communication systems, and global navigation satellite system (GNSS) receivers. For example, a UE may be equipped with a LTE module and a Bluetooth module in order to receive a voice over Internet (VoIP) services and multimedia services using a Bluetooth earphone. A UE may be equipped with a LTE module and a Wi-Fi module in order to distribute traffics. A UE may be equipped with a LTE module and a GNSS module in order to acquire location information additionally.

Due to extreme proximity of multiple radio transceivers within the same UE, the transmit power of one transmitter may be much higher than the received power level of another receiver. By means of filter technologies and sufficient frequency separation, the transmit signal may not result in significant interference. But for some coexistence scenarios, e.g., different radio technologies within the same UE operating on adjacent frequencies or sub-harmonic frequencies, the interference power coming from a transmitter of the collocated radio may be much higher than the actual received power level of the desired signal for a receiver. This situation causes in-device coexistence (IDC) interference. The challenge lies in avoiding or minimizing IDC interference between those collocated radio transceivers, as current state-of-the-art filter technology might not provide sufficient rejection for certain scenarios. Therefore, solving the interference problem by single generic radio frequency (RF) design may not always be possible and alternative methods needs to be considered.

To avoid the IDC interference, autonomous denial may be used. If it is expected that reception of important messages of coexisting radio modules is difficult due to transmission of one radio module, the UE may deny assigned UL transmission autonomously in a specific number configured by an eNodeB (eNB). Therefore, the coexisting radio module may receive important messages.

It is not defined how to perform the autonomous denial for secondary cells (SCells) when multiple serving cells are configured.

SUMMARY OF THE INVENTION

The present invention provides a method for applying autonomous denial in a wireless communication system. The present invention provides a method for applying autonomous denial, which is to solve in-device coexistence (IDC) interference, for a secondary cell (SCell) when a user equipment (UE) is served by multiple serving cells.

In an aspect, a method for applying, by a user equipment (UE), autonomous denial in a wireless communication system is provided. The method includes counting the number of aggregated denials of uplink (UL) subframes in all serving cells over a validity period including previous subframes and a current subframe, and denying scheduled UL transmission at the current subframe if the number of aggregated denials of UL subframes in all serving cells is less than a threshold.

The threshold may be the maximum aggregate number of the assigned UL subframes for which the UE is allowed to deny the scheduled UL transmission in any serving cells.

The threshold may be configured for the UE.

The method may further include receiving the validity period and the threshold from a network. The validity period and the threshold may be received via a radio resource control (RRC) connection reconfiguration message.

In another aspect, a method for applying, by a user equipment (UE), autonomous denial in a wireless communication system is provided. The method includes counting the number of aggregated denials of uplink (UL) subframes in each serving cell over a validity period including previous subframes and a current subframe, and denying scheduled UL transmission at the current subframe if the number of aggregated denials of UL subframes in each serving cell is less than a threshold.

The threshold may be the maximum aggregate number of the assigned UL subframes for which the UE is allowed to deny the scheduled UL transmission in each serving cell.

The threshold may be configured for the each serving cell.

In another aspect, a user equipment (UE) in a wireless communication system is provided. The UE includes a radio frequency (RF) unit for transmitting or receiving a radio signal, and a processor coupled to the RF unit, and configured to count the number of aggregated denials of uplink (UL) subframes in all serving cells over a validity period including previous subframes and a current subframe, and deny scheduled UL transmission at the current subframe if the number of aggregated denials of UL subframes in all serving cells is less than a threshold.

A UE can perform autonomous denial for multiple serving cells, and accordingly, a case that a radio module cannot receive important messages can be avoided.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). $3^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
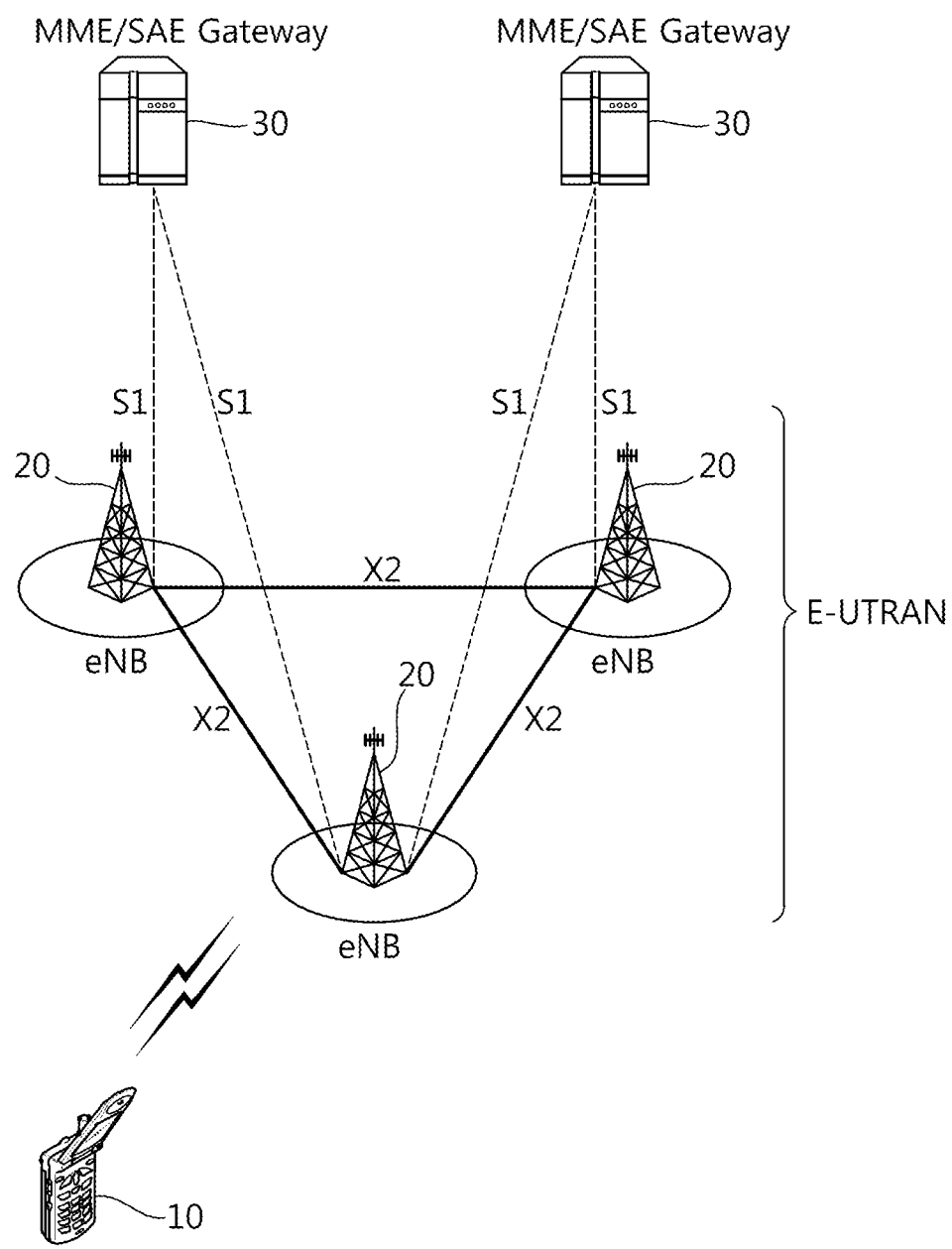
FIG. 1 shows LTE system architecture.

FIG. 1 shows LTE system architecture.

The LTE system architecture includes a user equipment (10), an evolved-UMTS terrestrial radio access network (E-UTRAN) and an evolved packet core (EPC). The UE 10 may be fixed or mobile, and may be referred to as another terminology, such as a mobile station (MS), a user terminal (UT), a subscriber station (SS), a wireless device, etc. The E-UTRAN includes a plurality of evolved node-Bs (eNBs) 20. The eNB 20 provides a control plane and a user plane to the UE 10. The eNB 20 is generally a fixed station that communicates with the UE 10 and may be referred to as another terminology, such as a base station (BS), a base transceiver system (BTS), an access point, etc. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

The EPC includes a mobility management entity (MME) which is in charge of control plane functions, and a serving gateway (S-GW) which is in charge of user plane functions. The EPC may further include a packet data network (PDN) gateway (PDN-GW). The MME has UE access information or UE capability information, and such information may be primarily used in UE mobility management. The S-GW is a gateway of which an endpoint is an E-UTRAN. The PDN-GW is a gateway of which an endpoint is a PDN.

Interfaces for transmitting user traffic or control traffic may be used. The UE 10 and the eNB 20 are connected by means of a Uu interface. The eNBs 20 are interconnected by means of an X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

Figure 2:
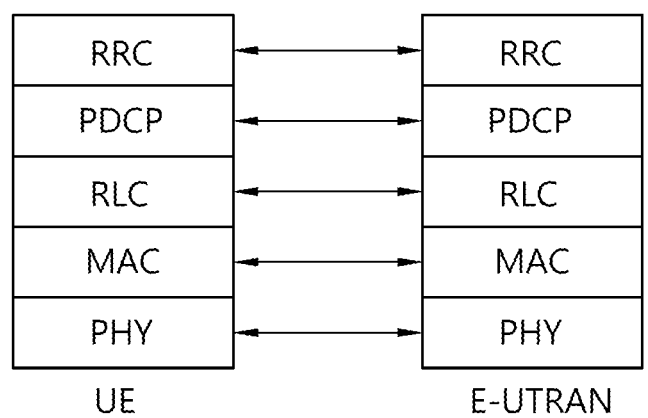
FIG. 2 shows a control plane of a radio interface protocol of an LTE system.
Figure 3:
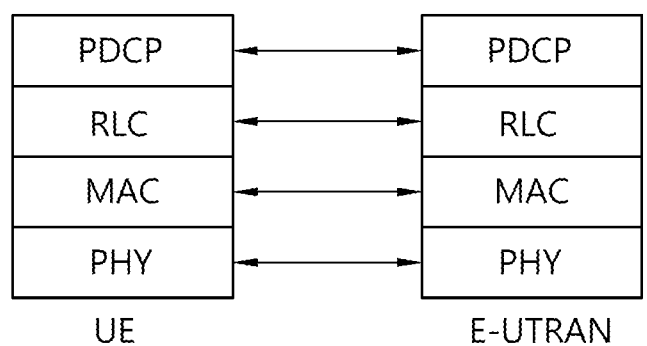
FIG. 3 shows a user plane of a radio interface protocol of an LTE system.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides an upper layer with an information transfer service through a physical channel. The PHY layer is connected to a medium access control (MAC) layer, which is an upper layer of the PHY layer, through a transport channel. Data is transferred between the MAC layer and the PHY layer through the transport channel. The transport channel is classified into a common transport channel and a dedicated transport channel according to whether the channel is shared or not. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ ACK/NACK signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

Figure 4:
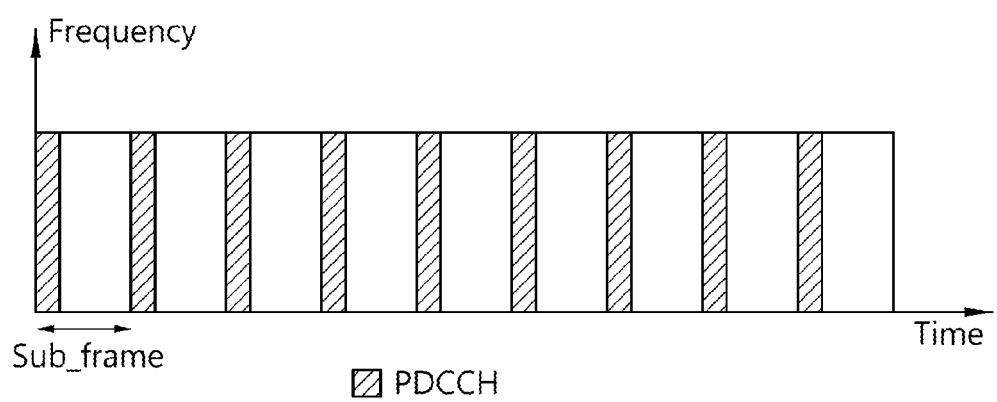
FIG. 4 shows an example of a physical channel structure.

FIG. 4 shows an example of a physical channel structure.

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. A transmission time interval (TTI) which is a unit time for data transmission may be equal to a length of one subframe.

A DL transport channel for transmitting data from the network to the UE includes a broadcast channel (BCH) for transmitting system information, a paging channel (PCH) for transmitting a paging message, a DL-SCH for transmitting user traffic or control signals, etc. The system information carries one or more system information blocks. All system information blocks may be transmitted with the same periodicity. Traffic or control signals of a multimedia broadcast/multicast service (MBMS) may be transmitted through the DL-SCH or a multicast channel (MCH). Meanwhile, a UL transport channel for transmitting data from the UE to the network includes a random access channel (RACH) for transmitting an initial control message, a UL-SCH for transmitting user traffic or control signals, etc.

A MAC layer belongs to the L2. The MAC layer provides a function of mapping multiple logical channels to multiple transport channels. The MAC layer also provides a function of logical channel multiplexing by mapping multiple logical channels to a single transport channel. The MAC layer is connected to a radio link control (RLC) layer, which is an upper layer of the MAC layer, through the logical channel. The logical channel is classified into a control channel for transmitting control plane information and a traffic channel for transmitting user plane information, according to a type of transmitted information.

The logical channel is located above the transport channel, and is mapped to the transport channel. The logical includes a broadcast control channel (BCCH), a paging control channel (PCCH), a common control channel (CCCH), a multicast control channel (MCCH), a multicast traffic channel (MTCH), etc.

An RLC layer belongs to the L2. The RLC layer provides a function of adjusting a size of data, so as to be suitable for a lower layer to transmit the data, by concatenating and segmenting the data received from an upper layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression, which decreases a size of an Internet protocol (IP) packet header which contains relatively large-sized and unnecessary control information, to support effective transmission in a radio section having a narrow bandwidth, when IP packets, i.e., IPv4 or IPv6, transmitted. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belonging to the L3 is defined only in the control plane. The RRC layer takes a role of controlling a radio resource between the UE and the network. For this, the UE and the network exchange an RRC message through the RRC layer. The RRC layer serves to control the logical channel, the transport channel, and the physical channel in association with configuration, reconfiguration, and release of RBs. An RB is a logical path provided by the L1 and L2 for data delivery between the UE and the network. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

An RRC state indicates whether an RRC layer of the UE is logically connected to an RRC layer of the E-UTRAN. When an RRC connection is established between the RRC layer of the UE and the RRC layer of the E-UTRAN, the UE is in an RRC connected state (RRC_CONNECTED), and otherwise the UE is in an RRC idle state (RRC_IDLE). Since the UE in RRC_CONNECTED has the RRC connection established with the E-UTRAN, the E-UTRAN may recognize the existence of the UE in RRC_CONNECTED and may effectively control the UE. Meanwhile, the UE in RRC_IDLE may not be recognized by the E-UTRAN, and a core network (CN) manages the UE in unit of a tracking area (TA) which is a larger area than a cell. That is, only the existence of the UE in RRC_IDLE is recognized in unit of a large area, and the UE must transition to RRC_CONNECTED to receive a typical mobile communication service such as voice or data communication.

When the user initially powers on the UE, the UE first searches for a proper cell and then remains in RRC_IDLE in the cell. When there is a need to establish an RRC connection, the UE which remains in RRC_IDLE establishes the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

The UE which remains in RRC_IDLE persistently performs cell reselection to find a better cell. In this case, the UE performs measurement and cell reselection by using frequency priority information. That is, the UE may determine which frequency will be preferentially considered when performing frequency measurement and cell reselection on the basis of the frequency priority information. The UE may receive the frequency priority information by using system information or an RRC connection release message. Or, the UE may receive the frequency priority information from another radio access technology (RAT) in inter-RAT cell reselection.

In-device coexistence (IDC) is described below. It may be referred to Section 23.4 of 3GPP TS 36.300 V11.2.0 (2012-06).

Figure 5:
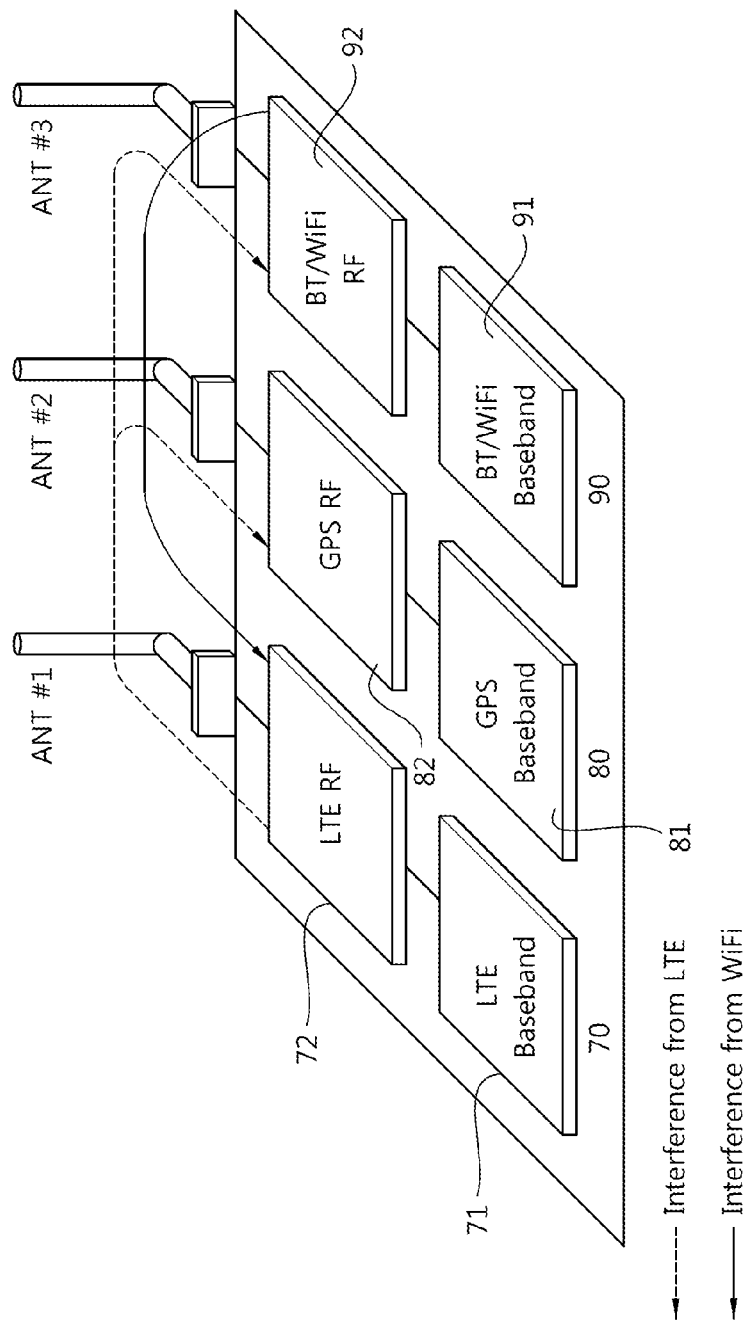
FIG. 5 shows an example of IDC interference within a UE.

FIG. 5 shows an example of IDC interference within a UE.

A LTE module 70 includes a LTE baseband 71 and a LTE radio frequency (RF) 72. A global positioning system (GPS) module 80 includes a GPS baseband 81 and a GPS RF 82. A Bluetooth (BT)/Wi-Fi module 90 includes a BT/Wi-Fi baseband 91 and a BT/Wi-Fi RF 92. For example, if all of the LTE module 70, the GPS module 80 and the BT/Wi-Fi module 90 are switched on, the LTE module 70 may interfere the GPS module 80 and the BT/Wi-Fi module 90. Or the BT/Wi-Fi module 90 may interfere the LTE module 70.

Coexistence interference scenarios between LTE radio and other radio technologies are described. 3GPP frequency bands around 2.4 GHz industrial, scientific and medical (ISM) bands are considered.

Figure 6:
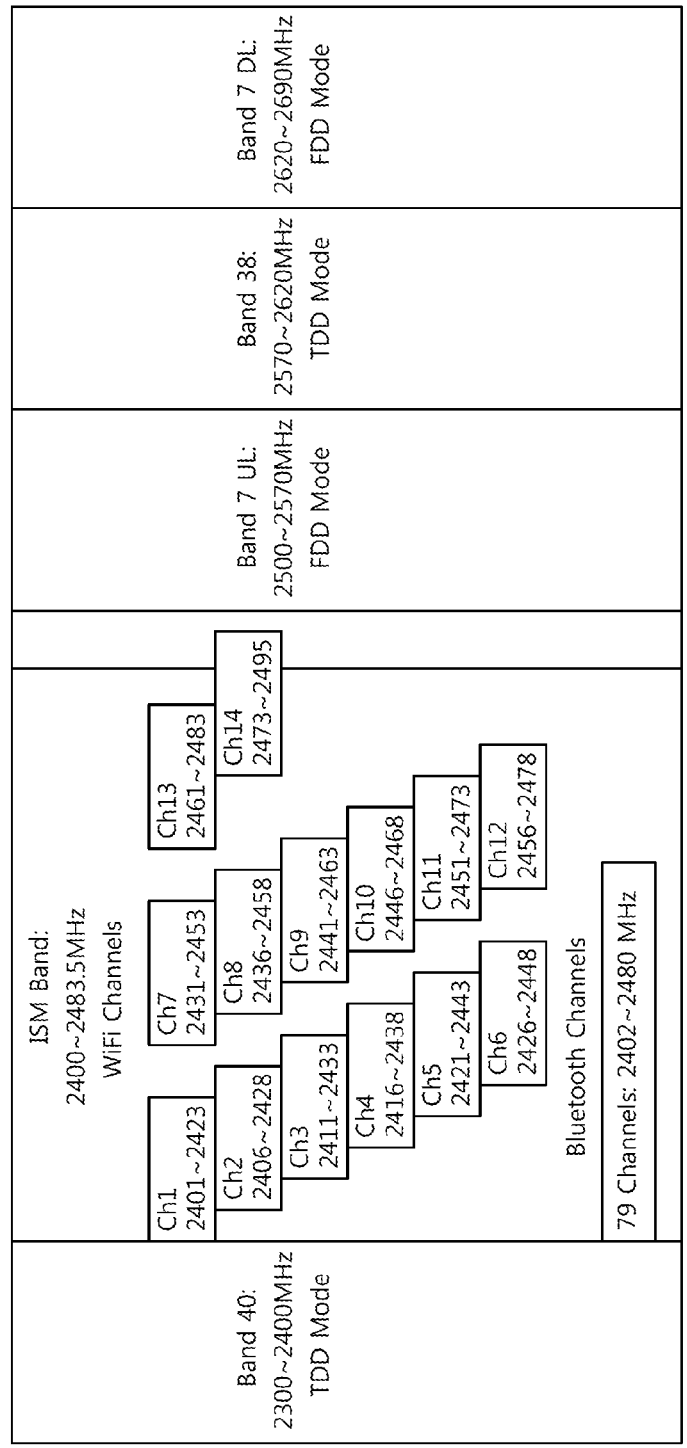
FIG. 6 shows 3GPP frequency bands around ISM band.

FIG. 6 shows 3GPP frequency bands around ISM band.

There are 14 channels demarcated in ISM band for Wi-Fi operation. Each channel has 5 MHz separation from other channel with an exception of channel number 14 where separation is 12 MHz. Channel 1 starts with 2401 MHz and channel 14 ends at 2495 MHz. Different countries have different policies for number of allowed channels of Wi-Fi. The transmitter of LTE band 40 may affect receiver of Wi-Fi and vice-versa. Since band 7 is a FDD band, so there is no impact on the LTE receiver from the Wi-Fi transmitter. But the Wi-Fi receiver will be affected by the LTE uplink transmitter.

Bluetooth operates in 79 channels of 1 MHz each in ISM band. The first channel starts with 2402 MHz and the last channel ends at 2480 MHz. Similar as Wi-Fi case, the activities of LTE band 40 and Bluetooth may disturb each other, and the transmission of LTE band 7 UL may affect Bluetooth reception as well.

Three modes are considered in order to avoid the IDC interference according to whether there is coordination between a LTE module and other coexisting radio modules or not and whether there is coordination between the LTE module and an eNB or not. At first, in an uncoordinated mode, different radio technologies within the UE operate independently without any internal coordination between each other. The LTE module and the network do not have any coordination between each other, either. In this case, the LTE module cannot handle appropriately deterioration of service quality due to the IDC interference as the LTE module does not know information on other coexisting radio modules. Secondly, in a UE-coordinated mode, there is an internal coordination between the different radio technologies within the UE, which means that at least the activities of one radio is known by other radio. Each radio module can know on/off status and/or traffic transmission status of other radio modules within the UE. However, the network is not aware of the coexistence issue possibly experienced by the UE and is therefore not involved in the coordination. Third, in a network-coordinated mode, there is an internal coordination between the different radio technologies within the UE, and there is coordination between the UE and the network. Each radio module can know on/off status and/or traffic transmission status of other radio modules within the UE, and the UE can inform the network of the IDC interference. Accordingly, the network makes determination for avoiding the IDC interference.

The LTE module may measure the IDC interference by cooperating with other radio modules within the UE or by inter/intra frequency measurements.

When a UE experiences a level of IDC interference that cannot be solved by the UE itself and a network intervention is required, the UE sends an IDC indication via dedicated RRC signaling to report the problems. The details of the IDC indication trigger are left up to UE implementation: it may rely on existing LTE measurements and/or UE internal coordination. The IDC indication should be triggered based on ongoing IDC interference on the serving or non-serving frequencies, instead of assumptions or predictions of potential interference. A UE that supports IDC functionality indicates this capability to the network, and the network can then configure by dedicated signaling whether the UE is allowed to send an IDC indication. The UE may only send an IDC indication for E-UTRA UL/DL carriers for which a measurement object is configured.

When notified of IDC problems through an IDC indication from the UE, the eNB can choose to apply a frequency division multiplexing (FDM) solution or a time division multiplexing (TDM) solution:

The basic concept of an FDM solution is to move the LTE signal away from the ISM band by performing inter-frequency handover within E-UTRAN. The FDM solution may be implemented by conventional handover procedures.

The basic concept of a TDM solution is to ensure that transmission of a radio signal does not coincide with reception of another radio signal. LTE DRX mechanism is considered as a baseline to provide TDM patterns (i.e. periods during which the LTE UE may be scheduled or is not scheduled) to resolve the IDC issues. DRX based TDM solution should be used in a predictable way, i.e. the eNB should ensure a predictable pattern of unscheduled periods by means of DRX mechanism.

Figure 7:
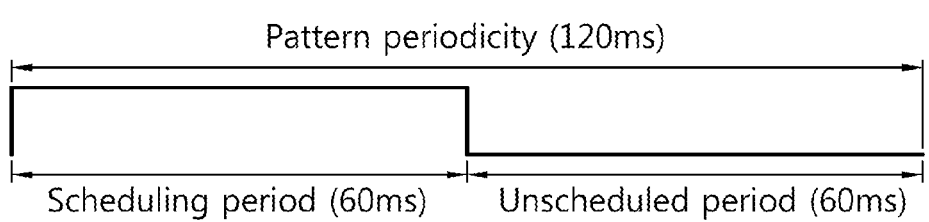
FIG. 7 shows an example of a TDM pattern according to a TDM solution.

FIG. 7 shows an example of a TDM pattern according to a TDM solution.

Referring to FIG. 7, a periodicity of a TDM pattern is 120 ms. A LTE module performs transmission or reception using only a scheduling period having a length of 60 ms. Another coexisting module performs transmission or reception using only an unscheduled period having a length of 60 ms.

To assist the eNB in selecting an appropriate solution, all necessary/available assistance information for both FDM and TDM solutions is sent together in the IDC indication to the eNB. The IDC assistance information contains the list of E-UTRA carriers suffering from ongoing interference and, depending on the scenario, it also contains TDM patterns or parameters to enable appropriate DRX configuration for TDM solutions on the serving E-UTRA carrier. The IDC indication is also used to update the IDC assistance information, including for the cases when the UE no longer suffers from IDC interference. A prohibit mechanism is used to restrict the interval at which the UE sends the IDC indication. In case of inter-eNB handover, the IDC assistance information is transferred from the source eNB to the target eNB.

Figure 8:
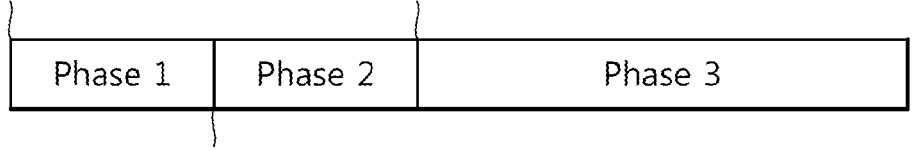
FIG. 8 shows different phases of IDC interference related to operation by a UE.

FIG. 8 shows different phases of IDC interference related to operation by a UE.

IDC interference situation may be divided into following three phases according to FIG. 8. In phase 1, the UE detects start of IDC interference but does not initiate the transmission of the IDC indication to the eNB yet. In phase 2, the UE has initiated the transmission of the IDC indication to the eNB and no solution is yet configured by the eNB to solve the IDC issue. In phase 3, the eNB has provided a solution that solved the IDC interference to the UE.

In different phases, UE behaviours related to radio resource management (RRM), radio link management (RLM), and channel state information (CSI) measurements are shown in Table 1.

TABLE 1

| Phases of IDC Interference | RRM Measurements | RLM Measurements | CSI Measurements |
|---|---|---|---|
| Phase 1 | Up to UE implementation and RRM measurement requirements apply | Up to UE implementation and RLM measurement requirements apply | Up to UE implementation and CSI measurement requirements apply |
| Phase 2 | UE shall ensure the measurements are free of IDC interference and RRM measurement requirements apply | UE shall ensure the measurements are free of IDC interference and RLM measurement requirements apply | |
| Phase 3 | UE shall ensure the measurements are free of IDC interference and RRM measurement requirements apply | UE shall ensure the measurements are free of IDC interference and RLM measurement requirements apply | |

In addition, once configured by the network, the UE can autonomously deny LTE UL transmission in all phases to protect ISM in rare cases if other solutions cannot be used. Conversely, it is assumed that the UE also autonomously denies ISM transmission in order to ensure connectivity with the eNB to perform necessary LTE procedures, e.g., RRC connection reconfiguration and paging reception, etc. The network may configure a long-term denial rate by dedicated RRC signaling to limit the amount of LTE UL autonomous denials. Otherwise, the UE shall not perform any LTE UL autonomous denials.

Parameters for the autonomous denial are configured in OtherConfig information element (IE). The OtherConfig IE contains configuration related to other configuration. Table 2 shows the OtherConfig IE.

Referring to Table 2, the OtherConfig IE includes parameters for the autonomous denial, i.e., autonomousDenialParameters field. The autonomousDenialParameters field includes autonomousDenialSubframes field and autonomousDenialValidity field. The autonomousDenialSubframes field indicates the maximum number of the assigned UL subframes for which the UE is allowed to deny the scheduled UL transmission. Value n2 corresponds to 2 subframes, n5 to 5 subframes, and so on. The autonomousDenialValidity field indicates the validity period over which the autonomous denial subframes shall be counted. Value sf200 corresponds to 200 subframes, sf500 corresponds to 500 subframes, and so on.

If the UE have multiple serving cells, the multiple serving cells may cause the IDC interference to the coexisting radio modules within the UE. In the prior art, it is defined for

TABLE 2

```
-- ASN1START
OtherConfig-r9 ::= SEQUENCE {
  reportProximityConfig-r9 ReportProximityConfig-r9 OPTIONAL,  -- Need ON
  ...,
  [[ idc-Config-r11 IDC-Config-r11 OPTIONAL,  -- Need ON
     powerPrefIndicationConfig-r11 PowerPrefIndicationConfig-r11 OPTIONAL,  -- Need
ON
     obtainLocationConfig-r11 ObtainLocationConfig-r11 OPTIONAL -- Need ON
  ]]
}
IDC-Config-r11 ::= CHOICE {
  Release NULL,
  Setup SEQUENCE {
    autonomousDenialParameters-r11 SEQUENCE {
      autonomousDenialSubframes-r11 ENUMERATED {n2, n5, n10, n15, n20, n30, spare2,
spare1 },
      autonomousDenialValidity-r11 ENUMERATED {
        sf200, sf500, sf1000, sf2000, spare4, spare3, spare2, spare1 }
    } OPTIONAL,  -- Need OR
    ...
  }
}
ObtainLocationConfig-r11 ::= SEQUENCE {
  obtainLocation-r11 ENUMERATED {setup} OPTIONAL -- Need OR
}
PowerPrefIndicationConfig-r11 ::= SEQUENCE {
  powerPrefIndication-Enabled-r11 ENUMERATED {enabled} OPTIONAL,  -- Need OR
  powerPrefIndication-Timer-r11 ENUMERATED {s0, s0dot5, s1, s2, s5, s10, s20,
    s30, s60, s90, s120, s300, s600, spare3, spare2, spare1} OPTIONAL  -- Cond
ppiENABLED
}
ReportProximityConfig-r9 ::= SEQUENCE {
  proximityIndicationEUTRA-r9 ENUMERATED {enabled} OPTIONAL, -- Need OR
  proximityIndicationUTRA-r9 ENUMERATED {enabled} OPTIONAL -- Need OR
}
-- ASN1STOP
``` performing autonomous denial when a single serving cell is configured. However, considering the scenario that the eNB may configure the IDC indications and secondary cells (SCells) at the same time, it is not defined how to perform the autonomous denial for the SCells. In this case, even if the coexisting radio module can receive important messages reliably by using the autonomous denial in a primary cell (PCell), the coexisting radio module may not receive the important messages due to transmission in SCells except the PCell.

Accordingly, a method for applying autonomous denial for SCells may be proposed according to an embodiment of the present invention. That is, a method for applying autonomous denial for multiple serving cells causing the IDC interference to the coexisting radio modules, which operate in adjacent frequencies, within the UE may be proposed according to an embodiment of the present invention. According to an embodiment of the present invention, in order to clearly define a network configuration and UE behaviors regarding to LTE autonomous denial for the IDC interference with carrier aggregation (CA) scenario, following methods may be proposed. In the following, it is assumed that SCells as well as PCell is configured. In addition, a moving window may be used to count the validity of the UL autonomous denial, i.e., the UE can deny a particular UL subframe if over a duration of validity period (i.e., autonomousDenialValidity) from this subframe in the past, the autonomousDenialSubframes will not exceed. That is, the UE may check whether the number of performed autonomous denials is lower than an autonomous denial rate, configured by the eNB, during the moving window, including the current subframe, in the past. If the number of performed autonomous denials is lower than the autonomous denial rate, the UE may additionally perform the autonomous denial in the current subframe. The autonomous denial rate may be defined by the value of autonomousDenialSubframes divided by the value of autonomousDenialSubframes. The value of autonomousDenialValidity and autonomousDenialSubframes may be configured by a UE-dedicated signaling as described in Table 2.

Various options for embodiments of the present invention may be configured according to a cell to which the autonomous denial is applied, the number of the configured autonomous denial rate, and whether the autonomous denial is applied per cell or per UE.

1) The UE may apply the configured autonomous denial rate only to the PCell.

In this case, the eNB may configure one autonomous denial rate that is applied to the PCell. Upon receiving the one autonomous denial rate by the eNB, the UE may perform the autonomous denial by applying the one autonomous denial rate to the PCell.

2) The UE may apply the configured autonomous denial rate only to either one or more cells indicated by the network or all serving cells including PCell and SCells (configured with uplink).

In this case, the eNB may transmit to the UE the configured autonomous denial rate and information on a cell to which the configured autonomous denial rate is applied. Upon receiving the information from the eNB, the UE may perform the autonomous denial by applying the configured autonomous denial rate to the cell indicated by the eNB.

2-1) The configured autonomous denial rate may be provided per cell (or frequency).

The eNB may transmit to the UE the configured autonomous denial rate per cell (or frequency) and information on a cell to which the configured autonomous denial rate is applied. The eNB may configure one or more autonomous denial rate. The eNB may configure only one autonomous denial rate which is applied to the multiple serving cells, or may configure multiple autonomous denial rates for the multiple serving cells. In this case, each configured autonomous denial rate may be linked to each serving cell among the multiple serving cells. The multiple serving cells may be all the serving cells or the serving cells indicated by the eNB. The UE may count the autonomous denial rate separately for each serving cell. The UE may be able to deny the UL transmissions up to the configured autonomous denial rate in each serving cell. The UE may be required to have moving windows as the same number as the number of the serving cells.

2-2) The configured autonomous denial rate is provided per UE.

The eNB may transmit to the UE the configured autonomous denial rate per UE.

The UE may count the autonomous denial rate altogether for all the serving cells.

The UE may be allowed to deny the uplink subframes until the total autonomous denial rate for all the serving cells does not exceed the configured autonomous denial rate. The UE may be required to have only one moving window.

2-3) Both per cell (or frequency) based autonomous denial rate and per UE based autonomous denial rate may be configured.

This is the combination of 2-1) and 2-2) described above. In other words, the eNB may configure the autonomous denial rate per UE and per cell (or frequency). In case of the autonomous denial rate per cell, one autonomous denial rate which may be applied to the multiple serving cells may be configured. Or, multiple autonomous denial rates may be configured, and each configured autonomous denial rate may be linked to each serving cell among the multiple serving cells. The UE may count the autonomous denial rate separately for each serving cell while the UE counts the autonomous denial rate altogether for all the serving cells. The UE may be allowed to deny the UL transmissions until both conditions are satisfied.

Condition 1: The number of denied subframes for each cell over a duration of a validity period from this subframe in the past does not exceed the configured autonomous denial rate for each cell.

Condition 2: The total number of denied subframes for all the serving cells over a duration of a validity period from this subframe in the past does not exceed the configured autonomous denial rate for the UE.

In addition, if the SCell becomes deactivated, UE may not apply the configured autonomous denial rate to deactivated SCell(s). If the SCell becomes activated, the UE may apply the configured autonomous denial rate to the activated SCell(s).

Hereinafter, embodiments of the present invention are described in detail. It is assumed that the UE is allowed to perform autonomous denial in all the serving cells. The configured autonomous denial rate consists of autonomousDenialSubframes and autonomousDenialValidity. A moving window is used to count the validity of the UL autonomous denial, i.e., the UE can deny a particular UL subframe if over a duration of a validity period from this subframe in the past, the value autonomousDenialSubframes will not be exceeded.

Figure 9:
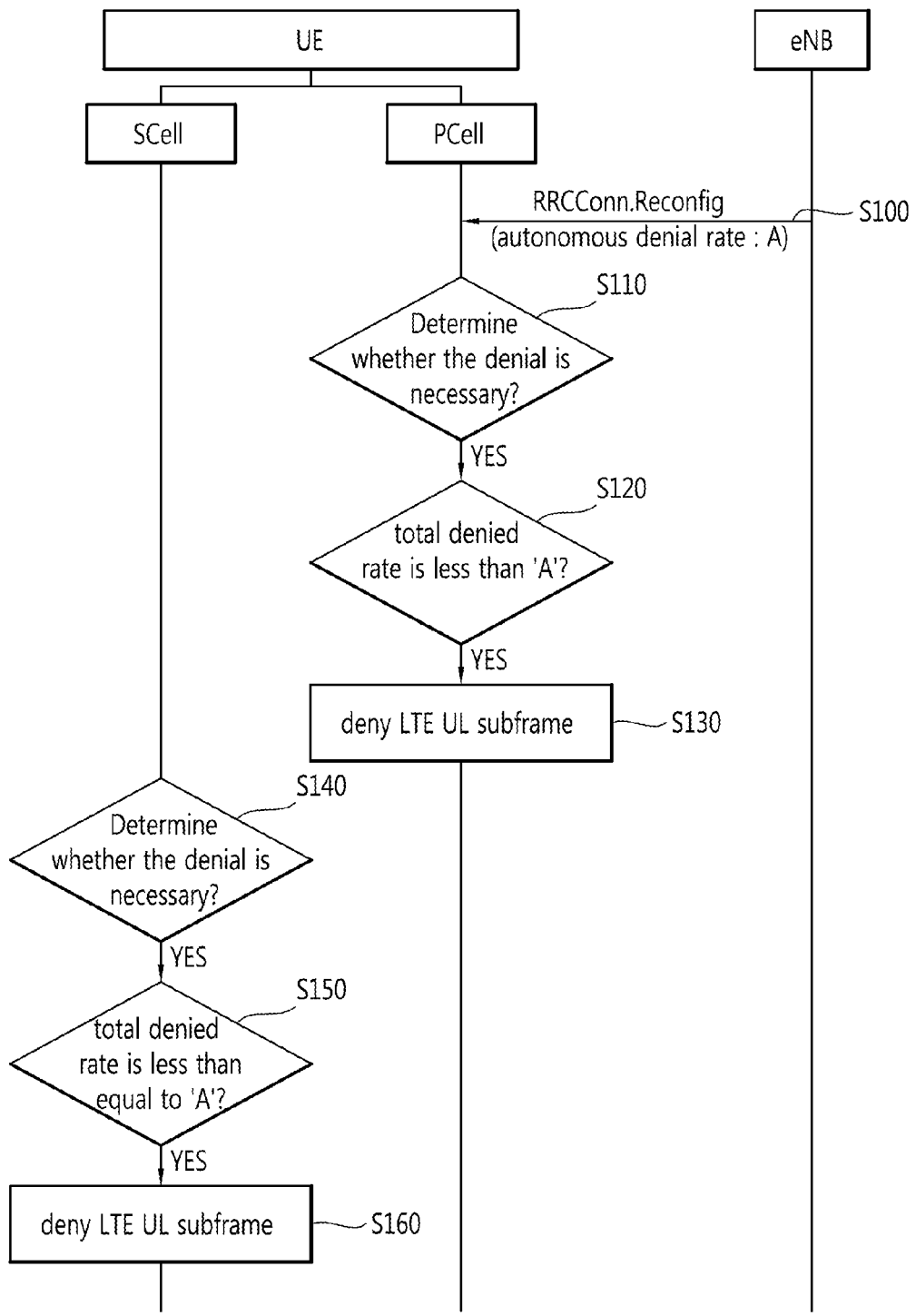
FIG. 9 shows an example of a method for applying autonomous denial per UE according to an embodiment of the present invention.

FIG. 9 shows an example of a method for applying autonomous denial per UE according to an embodiment of the present invention.

At step S100, the eNB configures an IDC indication through an RRCConnectionReconfiguration message. One autonomous denial rate 'A' is configured. The configured autonomous denial rate consists of autonomousDenialSubframes and autonomousDenialValidity.

Alternatively, among all the serving cells including PCell and SCell(s), some of them may be indicated by the RRCConnectionReconfiguration message to inform the UE that in which cell the UE is allowed to perform autonomous denial.

At step S110, if reception of an important ISM or GNSS signaling in other coexisting communication modules will coincide with LTE UL transmission of the PCell, the UE determines whether to perform LTE autonomous denial in the PCell.

At step S120, if the UE decides that denying the LTE UL transmission in the PCell is necessary, the UE evaluates whether the total number of denied UL subframes for all the serving cells over a duration of a validity period from this subframe in the past is less than the configured autonomous denial rate (i.e., autonomousDenialSubframes I autonomousDenialValidity) 'A'.

At step S130, if the total number of denied UL subframes for all the serving cells over the duration of the validity period from this subframe in the past is less than the configured autonomous denial rate 'A', the UE denies the UL subframe of the PCell.

At step S140, if reception of an important ISM or GNSS signaling in other coexisting communication modules will coincide with LTE UL transmission of the SCell(s), the UE determines whether to perform LTE autonomous denial in the SCell(s).

At step S150, if the UE decides that denying the LTE UL transmission in the SCell(s) is necessary, the UE evaluates whether the total number of denied UL subframes for all the serving cells over a duration of a validity period from this subframe in the past is less than the configured autonomous denial rate 'A'.

At step S160, if the total number of denied UL subframes for all the serving cells over the duration of the validity period from this subframe in the past is less than the configured autonomous denial rate 'A', the UE denies the UL subframe of the SCell(s).

Figure 10:
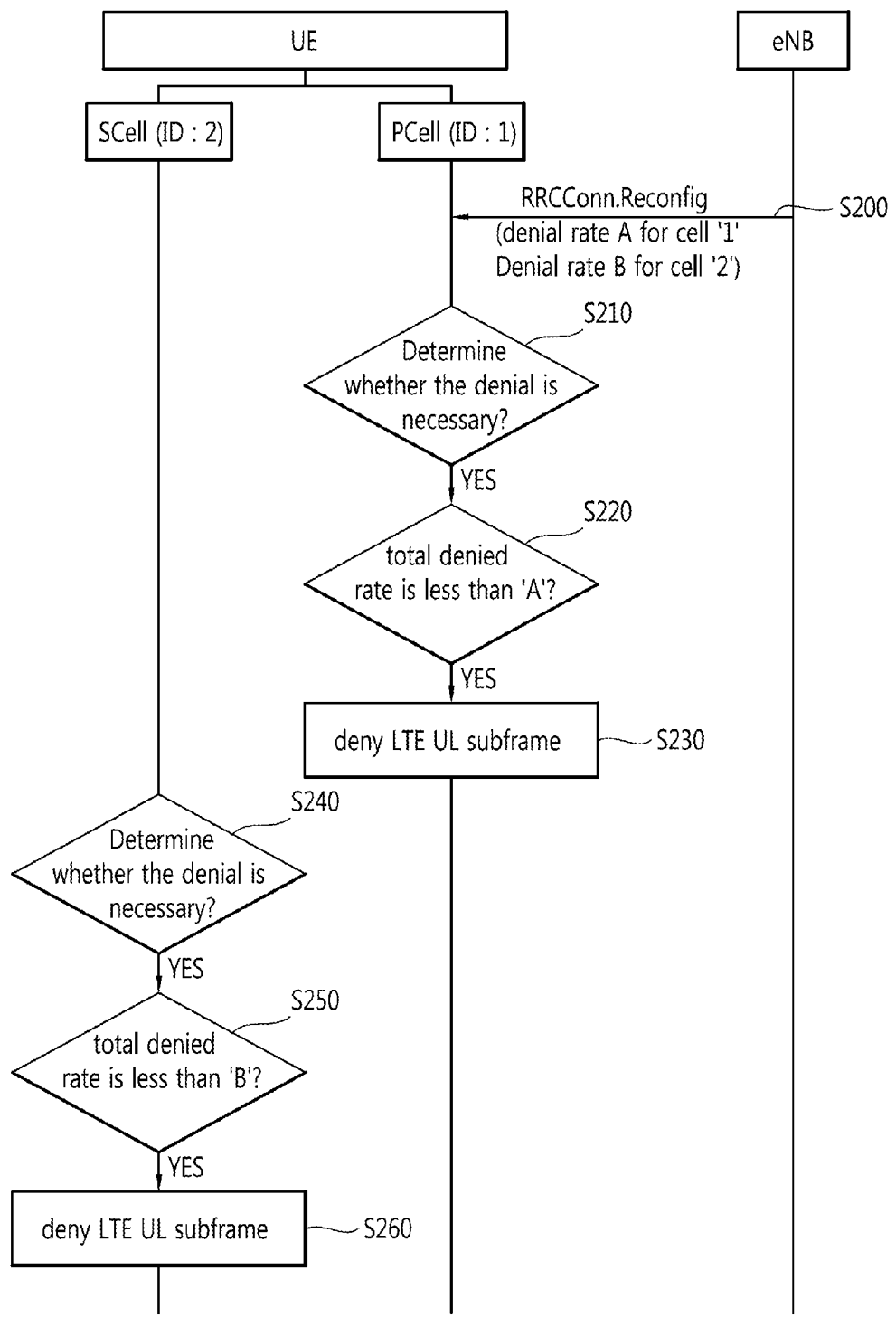
FIG. 10 shows an example of a method for applying autonomous denial per cell according to an embodiment of the present invention.

FIG. 10 shows an example of a method for applying autonomous denial per cell according to an embodiment of the present invention.

At step S200, the eNB configures an IDC indication through an RRCConnectionReconfiguration message. A first autonomous denial rate 'A' for the PCell, which has an identity of '1', and a second autonomous denial rate 'B' for the SCell(s), which has an identity of '2', are configured. The configured autonomous denial rate consists of autonomousDenialSubframes and autonomousDenialValidity.

Alternatively, among all the serving cells including PCell and SCell(s), some of them may be indicated by the RRCConnectionReconfiguration message to inform the UE that in which cell the UE is allowed to perform autonomous denial. In this case, the each indicated cell may be linked to an indicated autonomous denial rate.

At step S210, if reception of an important ISM or GNSS signaling in other coexisting communication modules will coincide with LTE UL transmission of the PCell '1', the UE determines whether to perform LTE autonomous denial in the PCell '1'.

At step S220, if the UE decides that denying the LTE UL transmission in the PCell '1' is necessary, the UE evaluates whether the total number of denied UL subframes for the PCell '1' over a duration of a validity period from this subframe in the past is less than the configured autonomous denial rate 'A'.

At step S230, if the total number of denied UL subframes for the PCell '1' over the duration of the validity period from this subframe in the past is less than the configured autonomous denial rate 'A', the UE denies the UL subframe of the PCell '1'.

At step S240, if reception of an important ISM or GNSS signaling in other coexisting communication modules will coincide with LTE UL transmission of the SCell(s) '2', the UE determines whether to perform LTE autonomous denial in the SCell(s) '2'.

At step S250, if the UE decides that denying the LTE UL transmission in the SCell(s) '2' is necessary, the UE evaluates whether the total number of denied UL subframes for the SCell(s) '2' over a duration of a validity period from this subframe in the past is less than the configured autonomous denial rate 'B'.

At step S260, if the total number of denied UL subframes for the SCell(s) '2' over the duration of the validity period from this subframe in the past is less than the configured autonomous denial rate 'B', the UE denies the UL subframe of the SCell(s) '2'.

Figure 11:
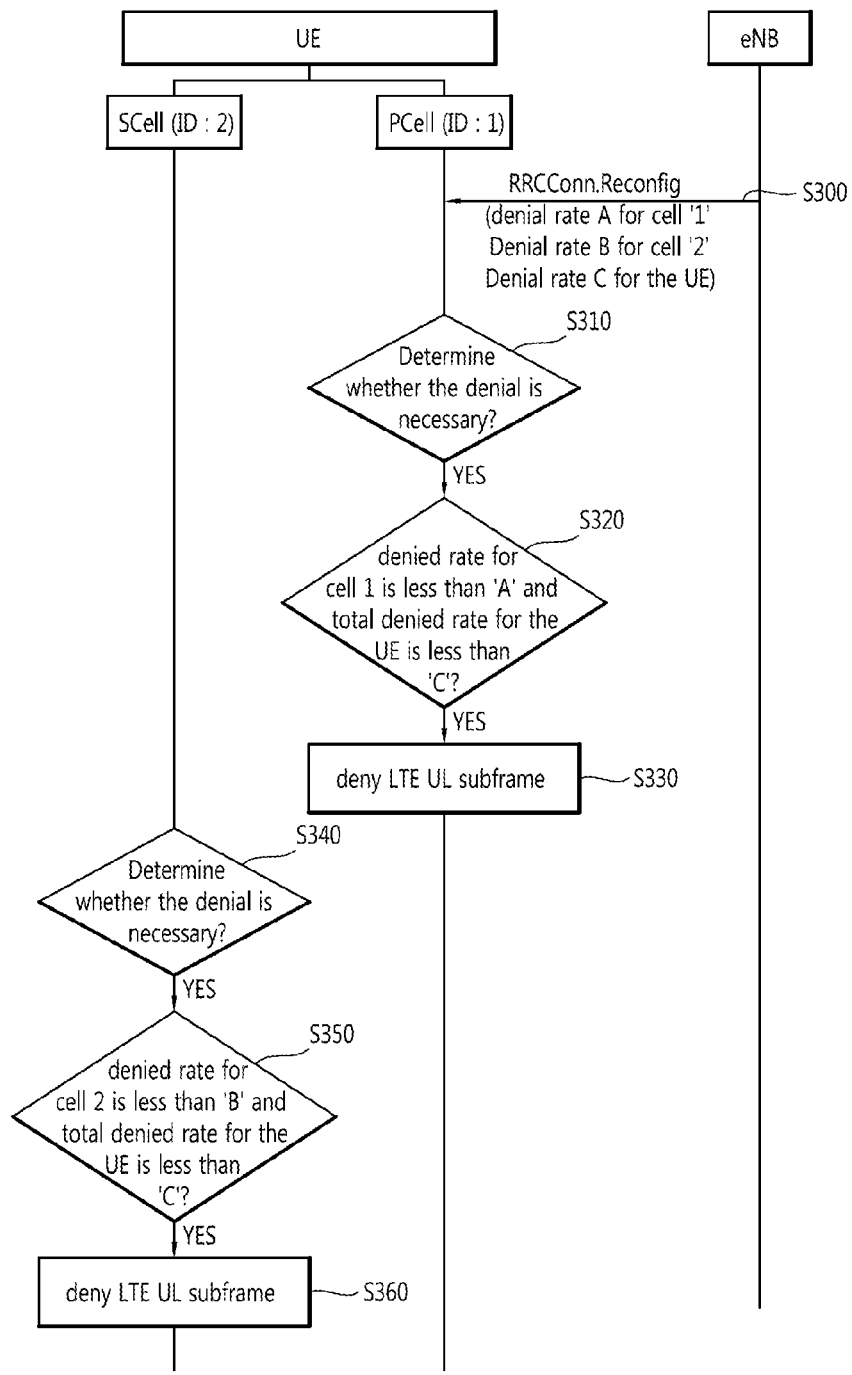
FIG. 11 shows an example of a method for applying autonomous denial per UE and per cell according to an embodiment of the present invention.

FIG. 11 shows an example of a method for applying autonomous denial per UE and per cell according to an embodiment of the present invention.

At step S300, the eNB configures an IDC indication through an RRCConnectionReconfiguration message. A first autonomous denial rate 'A' for the PCell, which has an identity of '1', and a second autonomous denial rate 'B' for the SCell(s), which has an identity of '2', are configured. In addition, a third autonomous denial rate 'C' for the UE (i.e., for all the serving cells or indicated serving cells) is configured. The configured autonomous denial rate consists of autonomousDenialSubframes and autonomousDenialValidity.

Alternatively, among all the serving cells including PCell and SCell(s), some of them may be indicated by the RRCConnectionReconfiguration message to inform the UE that in which cell the UE is allowed to perform autonomous denial. In this case, the each indicated cell may be linked to an indicated autonomous denial rate.

At step S310, if reception of an important ISM or GNSS signaling in other coexisting communication modules will coincide with LTE UL transmission of the PCell '1', the UE determines whether to perform LTE autonomous denial in the PCell '1'.

At step S320, if the UE decides that denying the LTE UL transmission in the PCell '1' is necessary, the UE evaluates whether the total number of denied UL subframes for the PCell '1' over a duration of a validity period from this subframe in the past is less than the configured autonomous denial rate 'A'. And, the UE also evaluates whether the total number of denied UL subframes for the UE over the duration of the validity period from this subframe in the past is less than the configured autonomous denial rate 'C'.

At step S330, if the total number of denied UL subframes for the PCell '1' over the duration of the validity period from this subframe in the past is less than the configured autonomous denial rate 'A', and the total number of denied UL subframes for the UE over the duration of the validity period from this subframe in the past is less than the configured autonomous denial rate 'C', the UE denies the UL subframe of the PCell '1'.

At step S340, if reception of an important ISM or GNSS signaling in other coexisting communication modules will coincide with LTE UL transmission of the SCell(s) '2', the UE determines whether to perform LTE autonomous denial in the SCell(s) '2'.

At step S350, if the UE decides that denying the LTE UL transmission in the SCell(s) '2' is necessary, the UE evaluates whether the total number of denied UL subframes for the SCell(s) '2' over a duration of a validity period from this subframe in the past is less than the configured autonomous denial rate 'B'. And, the UE also evaluates whether the total number of denied UL subframes for the UE over the duration of the validity period from this subframe in the past is less than the configured autonomous denial rate 'C'.

At step S360, if the total number of denied UL subframes for the SCell(s) '2' over the duration of the validity period from this subframe in the past is less than the configured autonomous denial rate 'B', and the total number of denied UL subframes for the UE over the duration of the validity period from this subframe in the past is less than the configured autonomous denial rate 'C', the UE denies the UL subframe of the SCell(s) '2'.

Figure 12:
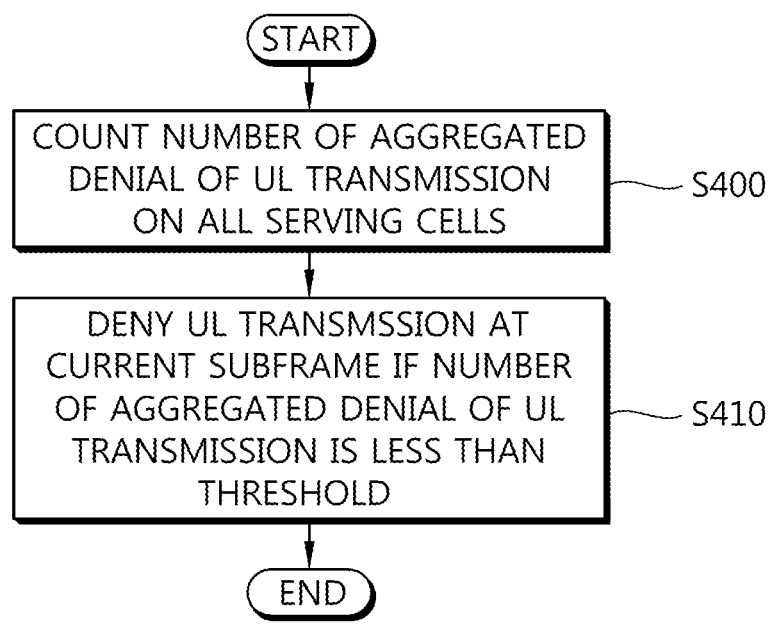
FIG. 12 shows another example of a method for applying autonomous denial per UE according to an embodiment of the present invention.

FIG. 12 shows another example of a method for applying autonomous denial per UE according to an embodiment of the present invention.

At step S400, the UE counts the number of aggregated denials of UL subframes in all serving cells over a validity period including previous subframes and a current subframe. At step S410, the UE may deny scheduled UL transmission at the current subframe if the number of aggregated denials of UL subframes in all serving cells is less than a threshold. The validity period and the threshold may be received via a radio resource control (RRC) message. The threshold may be the maximum aggregate number of the assigned UL subframes for which the UE is allowed to deny the scheduled UL transmission in any serving cells.

According to the embodiments of the present invention, field description of the autonomousDenialSubframes field and the autonomousDenialValidity field may be changed. For example, in case of the autonomous denial per UE described in FIG. 9 and FIG. 12, the autonomousDenial-Subframes field indicates the maximum aggregate number of the assigned UL subframes for which the UE is allowed to deny the scheduled UL transmission in any serving cells. Value n2 corresponds to 2 subframes, n5 to 5 subframes, and so on. The autonomousDenialValidity field indicates the validity period over which the autonomous denial subframes shall be counted in any serving cells. Value sf200 corresponds to 200 subframes, sf500 corresponds to 500 subframes, and so on. A moving window is used to count the validity of the UL autonomous denial, i.e., the UE can deny a particular UL subframe in any serving cells if over a duration of validity period from this subframe in the past, the autonomousDenialSubframes will not be exceeded.

Figure 13:
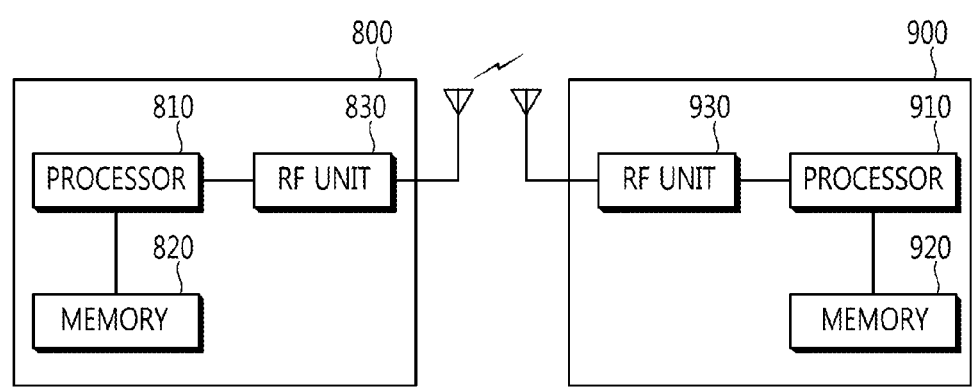
FIG. 13 is a block diagram showing wireless communication system to implement an embodiment of the present invention.

FIG. 13 is a block diagram showing wireless communication system to implement an embodiment of the present invention.

An eNB 800 may include a processor 810, a memory 820 and a radio frequency (RF) unit 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A UE 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

According to the embodiments of the present invention, the UE may perform per cell (frequency) based or per UE based LTE autonomous denial in multiple cells (frequencies) which can be all the serving cells including PCell and Scells or cells indicated by the network.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for applying, by a user equipment (UE), autonomous denial in a wireless communication system, where the UE is served by a primary cell (PCell) and a secondary cell (SCell) the method comprising:
  receiving a Radio Resource Control (RRC) connection reconfiguration message from a network,
  wherein the RRC connection reconfiguration message includes a first denial rate for the PCell, a second denial rate for the SCell, and a third denial rate for the UE;
  determining whether to perform an autonomous denial in the PCell;
  when it is determined that autonomous denial is performed in the PCell, counting a number of aggregated denials of uplink (UL) subframes in the PCell over a validity period;
  denying scheduled UL transmission at a current subframe when the number of aggregated denials of UL subframes in the PCell is less than the first denial rate and when a total number of aggregated denials of UL subframes for the UE is less than the third denial rate;
  determining whether to perform an autonomous denial in the SCell;

when it is determined that autonomous denial is performed in the SCell, counting a number of aggregated denials of uplink (UL) subframes in the SCell over the validity period; and denying scheduled UL transmission at the current subframe when the number of aggregated denials of UL subframes in the SCell is less than the second denial rate and when the total number of aggregated denials of UL subframes for the UE is less than the third denial rate.

2. The method of claim 1, wherein the first or second denial rate is the maximum aggregate number of assigned UL subframes for which the UE is allowed to deny the scheduled UL transmission in the PCell or SCell.

3. A user equipment (UE) in a wireless communication system, the UE comprising:
   a radio frequency (RF) unit that transmits or receives a radio signal; and
   a processor, coupled to the RF unit, that:
   controls the RF unit to receive a Radio Resource Control, RRC, connection reconfiguration message from a network,
   wherein the RRC connection reconfiguration message includes a first denial rate for the PCell, a second denial rate for the SCell, and a third denial rate for the UE;
   determines whether to perform an autonomous denial in the PCell;
   counts a number of aggregated denials of uplink (UL) subframes in the PCell over a validity period when it is determined that autonomous denial is performed in the PCell; and
   denies scheduled UL transmission at a current subframe when the number of aggregated denials of UL subframes in the PCell is less than the first denial rate and when a total number of aggregated denials of UL subframes for the UE is less than the third denial rate;
   determines whether to perform an autonomous denial in the SCell;
   counts a number of aggregated denials of uplink (UL) subframes in the SCell over the validity period when it is determined that autonomous denial is performed in the SCell; and
   denies scheduled UL transmission at the current subframe when the number of aggregated denials of UL subframes in the SCell is less than the second denial rate and when the total number of aggregated denials of UL subframes for the UE is less than the third denial rate.

4. The UE of claim 3, wherein the first or second denial rate is the maximum aggregate number of assigned UL subframes for which the UE is allowed to deny the scheduled UL transmission in the PCell or SCell.

* * * * *